United States Patent [19]

Itoh et al.

[11] 3,892,707

[45] July 1, 1975

[54] SILICONE ELASTOMER COMPOSITIONS

[75] Inventors: Kunio Itoh; Naohiko Harada, both of Annaka, Japan

[73] Assignee: Shinetsu Chemical Company, Japan

[22] Filed: May 10, 1974

[21] Appl. No.: 468,982

[30] Foreign Application Priority Data

May 15, 1973 Japan.................................. 48-53902

[52] U.S. Cl. ... 260/37 SB; 117/124 R; 117/132 BS; 117/138.8 R; 117/138.8 F; 260/46.5 UA; 260/46.5 G; 260/825

[51] Int. Cl............................................ C08g 51/04

[58] Field of Search....... 260/46.5 UA, 46.5 G, 825, 260/37 SB

[56] References Cited
UNITED STATES PATENTS

| | | | |
|---|---|---|---|
| 3,539,530 | 11/1970 | Karstedt...................... | 260/46.5 UA |
| 3,699,073 | 10/1972 | Wada et al...................... | 260/37 SB |
| 3,819,563 | 6/1974 | Takago et al.................. | 260/46.5 G |

*Primary Examiner*—Melvyn I. Marquis
*Attorney, Agent, or Firm*—Toren, McGeady and Stanger

[57] ABSTRACT

Silicone elastomer compositions comprising (a) a diorganovinylsilyl-terminated diorganopolysiloxane, (b) an alkenyl isopropenoxysilane or product of partial hydrolysis-condensation (c) an organohydrogenpolysiloxane and (d) platinum or platinum compounds as the catalyst. They possess an excellent fluidity, and are curable at moderate temperatures. The compositions are cured on heating with the formation of strong adhesive bonding to the surface of a substrate to which they are in contact.

9 Claims, No Drawings

SILICONE ELASTOMER COMPOSITIONS

FIELD OF THE INVENTION

This invention relates to silicone elastomer compositions curable at room temperature or moderate temperatures. More particularly, the invention relates to a silicone elastomer composition which exhibits a strong adhesion to the surfaces of plastics as well as metals when cured in contact with the surfaces and accordingly is suitable as a potting material in the technique of encapsulation for embedding components or equipment therein.

DESCRIPTION OF THE PRIOR ART

There have been provided silicone elastomer compositions consisting of various ingredients, which can cure at room temperature or at slightly elevated temperatures and are suitable for use in encapsulation. However, they exhibit poor adhesion to the surfaces of materials, for example, plastics when cured at relatively low temperatures, although somewhat stronger adhesive bonding can be obtained by high temperature curing. To solve these defects in the conventional compositions, it has been proposed to precoat the surfaces with a primer. However, such a precoating process has naturally rendered the use of the material in encapsulation more complicated without improved results.

OBJECTS OF THE INVENTION

Accordingly, the object of the invention is to introduce a novel silicone elastomer composition, which is free of the above-described disadvantages and which will cure even at a comparatively low temperature to provide strong adhesion to plastics or other surfaces and is, particularly for use as the potting material in the technique of encapsulation.

SUMMARY OF THE INVENTION

The composition of the invention consists essentially of the following components.

a. 100 parts by weight of a vinyl group terminated diorganopolysiloxane, having a viscosity of from 100 to 500,000 cs. at 25°C, which is represented by the general formula

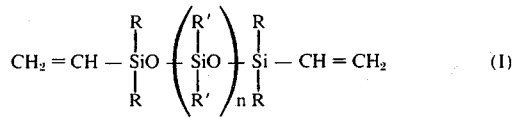

where R and R' each are unsubstituted or substituted monovalent hydrocarbon groups and n is a positive integer.

b. From 0.5 to 10 parts by weight of an unsaturated double bond-containing isopropenoxysilane, which is represented by the general formula

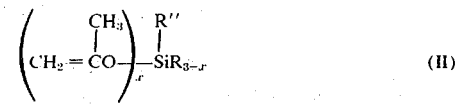

where R is as defined above, R'' is a monovalent organic group having an unsaturated double bond and x is 1, 2 or 3, or a product of its partial hydrolysis-condensation.

c. An organohydrogen polysiloxane, having at least two Si—H linkages in a molecule, represented by the average formula

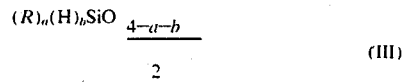

where R is an unsubstituted or substituted monovalent hydrocarbon group, $a$ is from 1 to 2 and $b$ is from 0.1 to 1.2 with the proviso that $(a + b)$ is from 2.0 to 2.7, in an amount such that the Si-bonded hydrogen atoms will be given in a ratio of from 0.5 to 1.2 per vinyl group directly bonded to the silicon atom in component (a) above, and d. Platinum or platinum compounds in a catalytic amount.

To further describe the components, component (a) is a vinyl-terminated organopolysiloxane fluid of the general formula (I), where R and R' each are unsubstituted or substituted monovalent hydrocarbon groups, exemplified by alkyl groups, such as, methyl, ethyl, and propyl, alkenyl groups, such as, vinyl and allyl, and aryl groups, such as, phenyl. It is preferred in the preparation of the silicone elastomer compositions according to the invention that the R and R' consist mainly of methyl groups and the degree of polymerization denoted by $n$ in formula (I) is a value such as to give component (a) a viscosity ranging from 100 to 500,000 cs. at 25°C.

Component (b) is an essential component that will afford a superior adhesive or bonding property to the finished silicone rubber composition. In formula (II) representing the isopropenoxysilane fluid, R is the same as defined above and R'' is vinyl, allyl, acryloxyalkyl, or methacryloxyalkyl, being bonded to Si by Si—C linkages. It is preferred in the preparation of the composition of the invention to have the R and R'' consist mostly of methyl and vinyl groups, respectively.

The examples of component (b) are vinylisopropenoxysilanes, such as, vinylmethyldiisopropenoxysilane and vinyltriisopropenoxysilane and products of partial hydrolysis-condensation thereof, such as, vinylisopropenoxypolysiloxanes. The vinylisopropenoxysilanes are prepared by subjecting vinylchlorosilanes and acetone to dehydrochlorination in the presence of an amine and zinc chloride as the catalyst (see Japanese Patent Publication No. 42-16611), or reacting vinylchlorosilanes with acetone in the presence of metallic sodium with the formation of sodium chloride and hydrogen as the by-products (see Japanese Patent Publication No. 42-23567). The vinylpropenoxypolysiloxanes are obtained by subjecting the vinylisopropenoxysilanes thus prepared to partial hydrolysis-condensation reactions.

The amount of component (b) to be used in the invention is from 0.5 to 10 parts by weight, preferably from 1 to 8 parts by weight, based on 100 parts by weight of component (a). A smaller amount than 0.5 part by weight would not impart in the cured state sufficient adhesive bonding properties to the cured compositions. On the other hand, an amount larger than 10 parts by weight would give unfavorable physical properties to the cured compositions.

Component (c) is an organohydrogen polysiloxane fluid having at least two Si—H bonds in a molecule, the R in formula (III) being an unsubstituted or substituted monovalent hydrocarbon group, exemplified by an alkyl group, such as, methyl, ethyl or propyl, an alkenyl group, such as, vinyl or allyl, or an aryl group, such as, a phenyl, and the subscripts $a$ and $b$ in the same formula being from 1 to 2 and from 0.1 to 1.2, respectively, with the proviso that $(a+b)$ is from 2.0 to 2.7.

The examples of component (c) are dimethylhydrogensilyl-terminated diorganopolysiloxanes, copolymers of dimethylsiloxane, methylhydrogensiloxane and trimethylsiloxane units, and low viscosity fluids of dimethylhydrogensiloxane and $SiO_2$ units. The component (c) should be used in an amount such that is sufficient to give hydrogen atoms in a ratio of from 0.5 to 1.2 per vinyl group directly bonded to the silicon atom in component (a) above.

Component (d), which is a platinum or a platinum compound, is needed for the purpose of accelerating the addition reaction between components (a) and (c). Examples of suitable materials are elemental platinum, chloroplatinic acids, complexes of chloroplatinic acids and alcohols, aldehydes or olefins. It is used in a catalytic amount which is usually from $10^{-3}$ to $10^{-6}$ mole of platinum (Pt) per mole of vinyl group directly bonded to the silicon atom in component (a).

The composition of the present invention may have increased adhesive bonding strength imparted thereto by adding an organic peroxide thereto, a conventional curing catalyst for heat curable silicone elstomers, such as, 2,4-dichlorobenzoyl peroxide, tertiary butyl perbenzoate or ditertiary butyl peroxide, the amount of the organic peroxide to be added being from about 0.1 to 2 parts by weight based on 100 parts by weight of component (a).

To the composition of the invention may be further added, if desired, inorganic fillers, such as silica aerogel, fumed silica, diatomaceous earth, quartz powder and metal oxides, in an amount of from 50 to 200 parts by weight based on 100 parts by weight of component (a). The addition of pigments and other additives is optional. When no inorganic filler can be employed, for example, in the case where a transparent composition is intended, it is also useful to add an organopolysiloxane copolymer in powdered form to improve the mechanical properties of the cured compositions. A preferable example of such an organopolysiloxane copolymer is one consisting of triorganosiloxy units, such as, vinyldimethylsiloxy and trimethylsiloxy units, and $SiO_2$ units. Especially useful is the copolymer wherein the triorganosiloxy unit/$SiO_2$ unit ratio is from 0.5 to 1 and the number of vinyl groups is from 2.5 to 10% of the total number of the organic groups directly bonded to silicon atoms. The amount of such a copolymer to be added is from 10 to 60 parts by weight based on 100 parts by weight of component (a).

The silicon rubber composition of the present invention is prepared by merely mixing components (a), (b), (c), and (d), and optionally organic peroxides and other additives. For the purpose of storage, however, it is more advantageous to keep the components in two separate packages and mix them just prior to use. There is no particular rule by which the components should be divided into two packages, but it is advantageous to make the first package of components (a), (b), and (d) and the second package of component (c) and the organic peroxides, if any.

The silicone elastomer composition of the present invention thus prepared will become cured when heated for more than 24 hours at 50°C or from 10 to 20 minutes at 100°C, with the formation of a strong adhesive bonding to the substrate surface with which it is in contact. In this case, even though the substrate surface has not been treated with any primer, the bonding between the surface and the cured composition is so strong that, if one tries to pull and separate the cured composition from the surface by force, a break will occur within the layer of the cured composition itself rather than at the interface.

The silicone elastomer compositions of the present invention are useful not only as sealing and coating agents and impregnating agents for glass fiber sleeves, but also as the potting material in the encapsulation process for embedding or packing various electronic components or equipment in containers made of various materials, including glass, metals, such as, aluminum, iron, and copper, and plastics, such as, epoxy resin, polyester resin, phenyl resin, and polycarbonate resin.

The following examples are given for the purpose of illustrating the invention, and it should be understood that the invention is not limited to the specific materials of operating conditions disclosed. In the examples, parts are all parts by weight.

EXAMPLE 1

A mixture of 300 parts of benzene, 81 parts of vinyltrichlorosilane, 130 parts of acetone, 200 parts of triethylamine and 0.9 part of zinc chloride in an autoclave was heated at 110°C for 16 hours. The resulting mixture was cooled, followed by removal of amine hydrochloride and then distilled, to obtain vinyltriisopropenoxysilane.

2, 5, 8, and 15 parts of the vinyltriisopropenoxysilane thus obtained were taken, and to each of them were added 100 parts of dimethylvinyl-terminated dimethylpolysiloxane having a viscosity of 10,000 cs. at 25°C together with 30 parts of a copolymer consisting of trimethylsiloxy, dimethylvinylsiloxy and $SiO_2$ units (triorganosiloxy units/$SiO_2$ units = 0.8) (dimethylvinylsiloxy units/silicon atoms = 0.07). To each mixture were added chloroplatinic acid in an amount equivalent to $2 \times 10^{-5}$ moles of platinum per mole of vinyl groups bonded to the silicon atoms in the component (a) and then 6 parts of a copolymer having a viscosity of 10 cs. at 25°C) consisting of $SiO_2$ and dimethylhydrogensiloxane units (dimethylhydrogensiloxane units/SiO units = 2), to obtain 4 different compositions. These compositions are identified for conveniences sake as formulations A, B, C and D, according to the varied amounts of vinyltriisopropenoxysilane added in turn. Further, another composition was prepared in which the vinyltriisopropenoxysilane was absent. This fifth composition is identified as formulation E.

Each of formulations A to E was applied on a test plate of polycarbonate to make a 1 mm thick layer, and the plate was heated at 100°C for 1 hour to cure the fluid composition. The cured layers from formulations A and B exhibited complete adhesion to the plate surfaces such that, when pulled by force, they broke. The cured layer from formulation C exhibited a complete adhesion to the plate surface, but its elastic property was somewhat inferior to that of the layers from formulations A and B, while the cured layer from formulation D was soft and limp, and did not possess the requirements for a rubbery elastomer. On the other hand, the cured layer from formulation E could be pulled and peeled from the test plate. It was then confirmed that the layer of formulation E heated at 100°C for 24 hours could also be peeled.

EXAMPLE 2

Each of formulations A and B of Example 1 were poured into a case made of polycarbonate (50 × 60 mm wide and 30 mm deep) and subjected to curing by heating at 100°C for 2 hours. The cured solid masses were dug into with a screwdriver, to show that the mass was firmly adhered to the walls of the case down to about 3 mm from its top surface, but it peeled off at deeper portions.

EXAMPLE 3

A mixture of 300 parts of benzene, 74.5 parts of methyltrichlorosilane, 130 parts of acetone, 160 parts of triethylamine and 0.9 part of zinc chloride in an autoclave was heated at 110°C for 16 hours. The resulting mixture was cooled, followed by removal of the amine hydrochloride and then distilled, to obtain methyltriisopenoxysilane.

To 5 parts of the methyltriisopropenoxysilane thus obtained were added 100 parts of dimethylvinyl-terminated dimethylpolysiloxane having a viscosity of 1,500 cs. at 25°C, 5 parts of a copolymer having a viscosity of 6 cs. at 25°C and consisting of 20 mole % dimethylhydrogensiloxane units, 60 mole % dimethylsiloxane units and 20 mole % methylhydrogensiloxane units, and 100 parts of quartz powder having an average particle size of about 15 μm. To the mixture was added a chloroplatinic acid in an amount equivalent to $2 \times 10^{-5}$ moles of platinum per mole of vinyl groups bonded to the silicon atoms in component (a). A coat of the resulting composition was applied on a test plate of polycarbonate and cured with heating at 100°C for 24 hours. The cured coat was pulled and easily peeled from the plate surface.

EXAMPLE 4

To 100 parts of dimethylvinylsilyl-terminated dimethylpolysiloxane having a viscosity of 600 cs. at 25°C were added 5 parts of vinyltriisopropenoxysilane, 150 parts of quartz powder having an average particle size of about 10 μm, and 10 parts of a copolymer having a viscosity of 100 cs. at 25°C and consisting of 30 mole % trimethylsiloxy-terminated methylhydrogensiloxane units and 70 mole % dimethylsilxoane units. Four mixtures were prepared by this formulation. To each of these mixtures were added 0.5, 1 or 4 parts of 2,4-dichlorobenzoylperoxide and a chloroplatinic acid in an amount equivalent to $2 \times 10^{-5}$ moles of platinum per mole of vinyl groups bonded to the silicon atoms in component (a). The resulting compositions are identified as formulations F, G and H, according to the varied amounts of 2,4-dichlorobenzoylperoxide added. Further, another composition was prepared in which no 2,4-dichlorobenzoylperoxide was present, identified as formulation I.

Each of formulations F to I was poured into a 50 mm deep case of phenol resin, and, after sufficient defoaming, subjected to curing by heating at 70°C for 4 hours. It was observed that the cured solid masses of formulations F and G were adherent to the entire wall surfaces of the cases, and that of formulation H resulted in a complete adhesion to the walls but was soft and weak, and did not meet the requirements for a rubbery elastomer, while that of formulation I adhered to the walls only down to about 1 mm deep from the top surface.

EXAMPLE 5

To 100 parts of dimethylvinyl-terminated dimethylpolysiloxane having a viscosity of 10,000 cs. at 25°C were added 5 parts of vinyltriisopropenoxysilane, 0.5 part of methylhydrogenpolysiloxane terminated by trimethylsiloxy units, having a viscosity of 10 cs. at 25°C, and 4 parts of organopolysiloxane consisting of 30 mole % of methylhydrogensiloxane units and 70 mole % of dimethylsiloxane units with trimethylsilyl units at the terminal, having a viscosity of 100 cs. at 25°C. To the resulting mixture were added 1 part of di-tertbutylbenzoylperoxide together with a chloroplatinic acid in an amount equivalent to $2 \times 10^{-5}$ moles of platinum per mole of vinyl groups bonded to the silicon atoms in component (a).

A coat of the composition thus obtained was applied on a plate of Noryl resin (trademark of General Electric Co.) and subjected to curing at 70°C for 24 hours. The cured coat was then found to be unadhered to the sheet. On the other hand, when the coat was cured at 100°C for 3 hours, the cured coat was strongly bonded to the plate.

EXAMPLE 6

To 100 parts of dimethylvinyl-terminated dimethylpolysiloxane having a viscosity of 5,000 cs. at 25°C were added 3 parts of vinyltriisopropenoxysilane, 25 parts of Silanox-101, (organochlorosilane-treated fume silica, trademark by Cabot Corp.) and 6 parts of organopolysiloxane consisting of 30 mole % of methylhydrogensiloxane units and 70 mole % dimethylsiloxane units with trimethylsilyl units at the terminals, having a viscosity of 100 cs. at 25°C. To this mixture were added 1 part of p-chlorobenzoylperoxide and chloroplatinic acid in an amount equivalent to $2 \times 10^{-5}$ moles of platinum per mole of vinyl groups bonded to the silicon atoms in component (a).

The resulting composition was applied to each of glass, ceramics, aluminum, iron, copper, nickel, epoxy resin, polyester resin, phenol resin, polycarbonate resin, and Noryl resin plates, and subjected to curing at 100°C for 2 hours. The cured compositions exhibited a good adhesion to all the substrates but the nickel plate.

What is claimed is:

1. A silicone elastomer composition consisting essentially of (a) 100 parts by weight of diorganovinylsilyl-terminated diorganopolysiloxane having a viscosity of from 100 to 500,000 cs. at 25°C, represented by the general formula

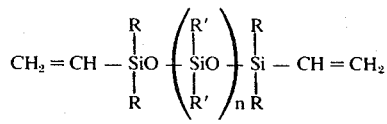

where R and R' each are unsubstituted or substituted monovalent hydrocarbon groups and n is a possitive integer, (b) from 0.5 to 10 parts by weight of an unsaturated double bond-containing isopropenoxysilane represented by the general formula

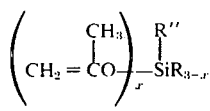

where R is as defined above, R'' is a monovalent organic group having an unsaturated double bond bonded to a silicon atom by the Si-C linkage, and $x$ is 1, 2 or 3, or a product of the partial hydrolysis-condensation thereof, (c) an organohydrogenpolysiloxane having at least two Si—H linkages in a molecule, represented by the general formula

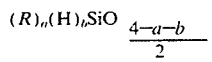

where R is as defined above, $a$ is from 1 to 2 and $b$ is from 0.1 to 1.2 with the proviso that $(a+b)$ is from 2.0 to 2.7, in an amount such that the Si-bonded hydrogen atoms are given in a ratio of from 0.5 to 1.2 per vinyl group directly bonded to the silicon atom in component (a), and (d) platinum or a platinum compound in a catalytic amount.

2. The silicone elastomer composition as claimed in claim 1 wherein component (b) is a vinyltriisopropenoxysilane or a product of the partial hydrolysis-condensation thereof in an amount ranging from 1 to 8 parts by weight based on 100 parts by weight of component (a).

3. The silicone elastomer composition as claimed in claim 1 further characterized in that it contains an organic peroxide in an amount of from 0.1 to 2 parts by weight based on 100 parts by weight of component (a).

4. The silicone elastomer composition as claimed in claim 3 wherein said organic peroxide is at least one selected from the group consisting of 2,4-dichlorobenzoylperoxide, tert-butylperbenzoate, di-tert-butylperoxide and 4-chlorobenzoylperoxide.

5. The silicone elastomer composition as claimed in claim 1 further characterized by that it contains a organopolysiloxane consisting of triorganosiloxy units, and SiO$_2$ units, the ratio of triorganosiloxy units to SiO$_2$ units being from 0.5 to 1 in an amount of 10 to 60 parts by weight based on 100 parts by weight of component (a).

6. The silicone elastomer composition as claimed in claim 5 wherein said triorganosiloxy units are composed of a combination of vinyldimethylsiloxy units and trimethylsiloxy units, the number of vinyl groups in said vinyldimethylsiloxy units being from 2.5% to 10% of the total number of organic groups in said triorganosiloxy units.

7. The silicone elastomer composition as claimed in claim 1 further characterized in that it contains an inorganic filler in an amount of from 50 to 200 parts by weight based on 100 parts by weight of component (a).

8. A silicone elastomer composition consisting essentially of (a) 100 parts by weight of dimethylvinylsilyl-terminated dimethylpolysiloxane having a viscosity of from 100 to 500,000 cs. at 25°C, (b) from 1 to 8 parts by weight of vinyltriisopropenoxysilane or a product of its partial hydrolysis-condensation, (c) an organohydrogenpolysiloxane fluid having at least two Si—H linkages in a molecule, represented by the general formula

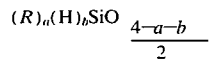

where R is an unsubstituted or substituted monovalent hydrocarbon group, $a$ is from 1 to 2 and $b$ is from 0.1 to 1.2 with the proviso that $(a+b)$ is from 2.0 to 2.7, in an amount such that the Si-bonded hydrogen atoms are given in a ratio of from 0.5 to 1.2 per vinyl group directly bonded to the silicon atom in component (a), and (d) platinum or a platinum compound in a catalytic amount.

9. The silicon elastomer composition as claimed in claim 8 further characterized in that it contains an organic peroxide in an amount of from 0.1 to 2 parts by weight based on 100 parts by weight of component (a).

* * * * *